United States Patent Office 3,240,734
Patented Mar. 15, 1966

3,240,734
COATING COMPOSITIONS COMPRISING ALDEHYDE MODIFIED AMIDE INTERPOLYMERS AND POLYAMIDE RESINS
Henry A. Vogel, Gibsonia, Pa., assignor to Pittsburgh Plate Glass Company, Pittsburgh, Pa., a corporation of Pennsylvania
No Drawing. Filed Dec. 19, 1963, Ser. No. 331,955
9 Claims. (Cl. 260—23)

This application is a continuation-in-part of copending application Serial No. 51,819, filed August 25, 1960, now United States Patent No. 3,117,693.

This invention relates to resinous compositions, useful as improved coating compositions, comprising an aldehyde-modified interpolymer of an unsaturated carboxylic acid amide and a polyamide of relatively high amine number.

Interpolymers of unsaturated carboxylic acid amides, and especially aldehyde-modified and etherified interpolymers of such amides with other ethylenically unsaturated monomers have been extensively employed in coatings for various purposes. A number of such interpolymers which have found wide commercial acceptance are disclosed, for example, in United States Patents Nos. 3,037,963 and 2,978,437. These interpolymers are employed as clear films or as resinous vehicles for enamels and other thermosetting compositions, and provide coatings with outstanding appearance and durability on appliances, exterior metal siding, containers, and the like.

The above-described coating compositions, although generally exhibiting highly desirable properties in all respects, have been found under certain conditions to be not completely satisfactory in their application properties and adhesion. The conditions in which such deficiencies occur are found, for example, in the use of metal substrates having an oily surface which is not sufficiently cleaned prior to application of the coating composition.

Because of the poor lubricity of aluminum and other metals, it has become a widespread practice, particularly in the container fabrication industry, to apply oils and similar lubricants to the surface of sheets and other bulk quantities of these metals to prevent scratching and generally improve their handling properties. The loss of adhesion and other disadvantages resulting from application of a coating to an oily surface becomes an important consideration when it is desired to coat such lubricated metals.

It has now been found that the addition of certain polyamide resins to the amide interpolymers greatly improves the properties of coatings based thereon when applied to oily metal surfaces in general, and especially surfaces of aluminum and steel.

The amide interpolymer component of the compositions of this invention can be any aldehyde-modified polymer of an unsaturated carboxylic acid amide; the aldehyde-modified interpolymer is preferably at least partially etherified. Aldehyde-modified amide polymers are obtained by polymerizing an unsaturated amide and at least one other ethylenically unsaturated monomer, and reacting the initial product of the polymerization with an aldehyde to replace amido hydrogen atoms with hydroxyorgano groups, e.g., an alkylol group. Etherification is carried out by further reaction of the hydroxyorgano groups with an alcohol. Alternatively, aldehyde-modified interpolymers are produced by interpolymerizing an aldehyde-modified amide, such as an alkylol amide, which may be then etherified, or by employing an N-alkoxyalkyl amide.

After reaction with the aldehyde and, to the extent desired, an alcohol, the amide interpolymer contains amido groups having a hydrogen atom replaced by the structure:

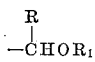

where R is hydrogen when the aldehyde employed is formaldehyde and an alkyl radical when other aliphatic aldehydes are used. $R_1$ represents an organic radical, derived by removing a hydroxyl group from the etherifying alcohol, or in those groups not etherified, represents hydrogen. $R_1$ in the etherified groups can be, for example, alkyl or aryl, with the terms "alkyl" and "aryl" being construed broadly; the groups represented by $R_1$ may include other substituents and functional groups which do not affect the properties of the product. Thus, $R_1$ may include unsaturated linkages, ether linkages, halogens and other substituents, or it may be cyclic. However, in the preferred products, $R_1$ in the etherified groups is a lower alkyl radical of 1 to 8 carbon atoms.

Satisfactory products for certain applications can be obtained with only a small part of the hydroxyorgano groups having been etherified, in some instances 5 percent or less, but it is usually desirable that at least about 50 percent of the hydroxyorgano groups be etherified. Otherwise, problems of storage stability or premature gelation, or lowered flexibility of the coating, may sometimes be encountered. Butanol is a preferred alcohol for use in the etherification, although any monohydric alcohol, such as methanol, ethanol, propanol, pentanol, octanol, decanol, and other alkanols containing up to about 20 or more carbon atoms, may also be employed, as may aromatic alcohols, such as benzyl alcohol; or cyclic alcohols, such as cyclohexanol; or the monoethers of glycols, such as butyl Cellosolve (ethylene glycol monobutyl ether), butyl Carbitol (diethylene glycol monobutyl ether), and other Cellosolves and Carbitols; or substituted alcohols, such as 3-chloropropanol.

Methods for producing N-alkoxyalkyl-substituted unsaturated carboxylic acid amides, such as N-butoxymethylacrylamide, which amides are quite useful to produce the amide interpolymers employed herein and contain the aforesaid structure without the need for further reaction with an aldehyde and alcohol, are disclosed in United States Patent No. 3,079,434, and United States Patent No. 3,087,965.

While either acrylamide or methacrylamide is preferred in the interpolymer component, any polymerizable ethylenically unsaturated carboxylic acid amide can be employed. Such other amides include itaconic acid diamide, alpha-ethyl acrylamide, crotonamide, fumaric acid diamide, maleic acid diamide, and other amides of alpha, beta-ethylenically unsaturated carboxylic acids containing up to about 10 carbon atoms. Maleuric acid and esters thereof, and imide derivatives such as N-carbamyl maleimide, may also be utilized.

At least one other unsaturated monomer is interpolymerized with the unsaturated carboxylic acid amide; and polymerizable ethylenically unsaturated monomer can be so utilized. Such monomers include monoolefinic and diolefinic hydrocarbons, halogenated monolefinic and diolefinic hydrocarbons, unsaturated esters of organic and inorganic acids, esters of unsaturated acids, nitriles, unsaturated acids, and the like. The interpolymer compositions described in United States Patent No. 3,037,963 are excellent examples of the preferred type of amide interpolymers utilized in the instant invention, and the many unsaturated compounds disclosed therein illustrate the numerous monomers which can be interpolymerized along with the amide.

Preferably, the amide interpolymer should contain from about 2 percent to about 50 percent by weight of the unsaturated carboxylic acid amide, the balance being the other ethylenically unsaturated monomer or monomers.

In carrying out the polymerization reaction, a catalyst is ordinarily utilized. Useful catalysts for this purpose include peroxygen compounds such as cyclohexanone peroxide, cyclohexyl hydroperoxide, cumene hydroperoxide, acetyl peroxide, lauroyl peroxide, benzoyl peroxide, methyl cyclohexyl hydroperoxide, di-t-butyl peroxide, peracetic acid, t-butyl permaleic acid, di-t-butyl diperphthalate, and the like. Azo compounds, such as p-methoxyphenyl diazothio-(2-naphthyl) ether and alpha, alpha'-azo-bis-isobutyronitrile, are also often used. Redox catalyst systems may also be employed. The quantity of catalyst can be varied considerably; a suitable amount is from about 0.1 to 2.0 percent by weight of the monomers.

In many instances, it is also desirable to add a chain-modifying or "short-stopping" agent to the polymerization mixture. Mercaptans are conventionally used for this purpose, but other chain-modifying agents, such as cyclopentadiene, allyl carbamate, alpha-methyl styrene, and the like, can also be used to secure low molecular weights, as can unsaturated fatty acids or esters.

The polymerization to produce the amide interpolymer is best carried out by admixing the amide, any other monomer or monomers, and the catalyst and chain-modifying agent, if any, in a solvent, and refluxing the resulting solution for a time sufficient to obtain the desired conversion, usually about 1 to 16 hours. It is often desirable to add the catalyst in increments as the polymerization progresses, and good agitation and careful temperature control are also desirable because of the very rapid reaction rate and because the reaction is highly exothermic.

When necessary to produce the desired structures, the amide interpolymer is reacted with an aldehyde, preferably in the presence of an alcohol. Formaldehyde, in solution in water (formalin) or in an alkanol such as butanol, or a formaldehyde-yielding substance such as paraformaldehyde, trioxymethylene or hexamethylenetetramine, is greatly preferred. However, other aldehydes, including acetaldehyde, butyraldehyde, furfural, and the like, preferably containing only atoms of carbon, hydrogen and oxygen, can be used. It is ordinarily preferred to utilize about 2 equivalents of aldehyde for each amide group present in the interpolymer, although this ratio may be raised or lowered considerably if desired. For example, the ratio may be as high as 3.0 equivalents or as low as about 0.2 equivalent of aldehyde for each amide group in the interpolymer.

The reaction is preferably carried out by refluxing the aldehyde, alkanol and the interpolymer in the presence of a mild acid catalyst, such as maleic anhydride, and removing the water of reaction. Other acid catalysts such as oxalic acid, hydrochloric acid or sulfuric acid can also be employed, although there is some possibility of gelation occurring if the acid catalyst is too strongly acidic. The quantity of catalyst utilized may be varied widely; the more acidic the reaction medium, the greater the amount of etherification which will occur.

The compositions of this invention comprise the above-described amide interpolymers blended with polyamides derived from polymeric fatty acids and polyalkylene polyamines. To achieve the properties described, the polyamide should have an amine number of at least about 50, with polyamides having amine numbers as high as 400 or even higher being useful. The amine number is indicative of the free amine groups and is defined as the number of milligrams of potassium hydroxide equivalent to the number of free amine groups present in one gram of the polyamide resin, as determined by HCl titration.

The polyamide is prepared by amidification of polymeric fatty acids by a polyalkylene polyamine using the usual conditions employed for this type of reaction. The term "polymeric fatty acids" as used herein includes the products obtained from the polymerization of drying or semi-drying oils or the free acids therefrom, or simple aliphatic alcohol esters of such acids. Suitable drying or semi-drying oils include soybean oil, linseed oil, tung oil, perilla oil, oiticica oil, cottonseed oil, corn oil, tall oil, sunflower oil, safflower oil, dehydrated castor oil, and the like. When such polymeric fatty acids are prepared, those fatty acids with sufficient unsaturated linkages combine, for the most part, it is believed, by a Diels-Alder mechanism, to provide a mixture of dibasic and higher polymeric acids. The acids which do not react remain as monomers and may be wholly or partially removed by distillation or other means. The product mixture of polymeric fatty acids usually contains predominantly dimeric acids, a small quantity of trimeric and higher polymeric acids, along with some residual monomeric acids.

The polyalkylene polyamine reacted with the foregoing polymeric fatty acids to produce the polyamides utilized herein can be diethylene triamine, triethylene tetramine, ethylene liamine, dipropylene triamine, 3,3'-imino-bis-propylamine, or any other polyalkylene polyamine having at least 2 amino groups coupled with an alkylene linkage. Mixtures of polyalkylene polyamines can also be employed.

The polyamides produced generally have molecular weights varying from about 1000 to about 10,000 and are resistant to water, alkali, acids, oils, greases, and organic solvents. Various of these polyamides and the methods for their preparation are disclosed in United States Patents Nos. 2,379,413, 2,450,940, 2,707,708, 2,844,552, 2,919,255 and others.

The proportions of the amide interpolymer and the polyamide resin can be varied within wide limits. For example, satisfactory results for various purposes are attained when the amide interpolymer is combined with from about 1 to about 50 percent by weight or more of the polyamide, based on nonvolatile resin solids content. However, the preferred range is from about 3 to about 10 percent by weight of the polyamide.

The amide interpolymer and the polyamide are blended together to form the compositions of the invention. No particular conditions or method of blending are necessary, and to that extent, interaction between the interpolymer and the polyamide is not indicated. However, since these components each contain reactive groups, it may be that some reaction takes place either during mixing or curing or both.

The resinous blends described can be used as such to provide clear films, but are more conventionally utilized in coating compositions containing pigments, fillers, plasticizers, and similar conventional additives. One or more solvents are also generally present. These coating compositions can be applied by any means ordinarily used with compositions based on the amide interpolymers, such as by brushing, spraying, roller coating, and the like. They require the application of heat to cure the coating and provide optimum properties. The baking schedules employed depend upon the nature of the particular composition, the nature of the substrate, and the manner in which it is to be used. The inclusion of an acid monomer in the amide interpolymer or the addition of various agents will lower the effective curing temperature. Generally speaking, temperatures of at least 200° F. and preferably 300° F. are employed.

A typical amide interpolymer employed in formulating compositions in accordance with this invention is produced as follows:

AMIDE INTERPOLYMER A

A reaction vessel is charged with the following monomers:

| | Parts by weight |
|---|---|
| Acrylamide | 10 |
| Styrene | 55 |
| Methacrylic acid | 5 |
| Ethyl acrylate | 130 |

There are then added 50 parts of butanol, 150 parts of high boiling aromatic naphtha (Solvesso 150), 2 parts of cumene hydroperoxide and 2 parts of tertiary dodecyl mercaptan. This mixture is refluxed for 8 hours with 1 additional part of cumene hydroperoxide being added after the second, fourth, sixth and eighth hours. After the eighth hour, there are also added 21.2 parts of a 40 percent solution of formaldehyde in n-butanol (butyl Formcel) and 0.27 part of maleic anhydride. Refluxing is continued for 3 hours with the water of reaction being removed azeotropically. The product is cooled and sufficient of the foregoing solvent mixture added to produce a solution having a nonvolatile resin solids content of 50 percent.

Set forth below are several examples of coating compositions utilizing the invention described herein.

Example 1

In this example, the polyamide employed is the liquid polyamide resin known commercially as Versamid 115. It is comprised of the reaction product of ethylene diamine and polymeric fatty acids comprising chiefly dilinoleic acid. Its properties are as follows:

| | |
|---|---|
| Amine number | 210–220 |
| Brookfield viscosity (No. 3 spindle, 20 r.p.m., 75° C.) poises | 31–38 |
| Pounds per gallon, 25° C. | 8.1 |
| Flash point (ASTM D–82) ° C. | 295 |

The coating composition was formulated by thoroughly blending the following:

| | Parts by weight |
|---|---|
| Amide interpolymer A | 200 |
| Polyamide (Versamid 115) | 6 |
| Titanium dioxide pigment | 100 |

Example 2

The polyamide in this example is the product known commercially as Versamid 100, understood to be the product of polymeric fatty acids composed chiefly of dimeric acids and an ethylene polyamine. It has the following properties:

| | |
|---|---|
| Amine number | 83–93 |
| Brookfield viscosity (No. 3 spindle, 20 r.p.m., 150° C.) poises | 7–12 |
| Pounds per gallon, 25° C. | 8.1 |
| Flash point (ASTM D–82) ° C. | 325 |

The coating composition was produced from the following:

| | Parts by weight |
|---|---|
| Amide interpolymer A | 200 |
| Polyamide (Versamid 100) | 6 |
| Titanium dioxide pigment | 100 |

The above coating compositions were evaluated by applying them on lubricated sheet aluminum containing a hydrocarbon oil on its surface, at a coating weight of 10 milligrams per square inch. The coating was cured by baking for 10 minutes at 385° F. For comparison purposes, a similar coating composition containing amide interpolymer A but differing only in that the polyamide was omitted, was coated on the same oily aluminum sheet. Each of the coated sheets was then fabricated into can ends and attached to can bodies. These containers were then subjected to the following tests:

Test A—Immersion in water at room temperature for 24 hours
Test B—Immersion in boiling water for 30 minutes
Test C—Subjection to steam at 250° F. for 3 hours The results are tabulated below:

| Coating | Test A | Test B | Test C |
|---|---|---|---|
| Example 1 | Unaffected | Unaffected | Unaffected. |
| Example 2 | Unaffected | Unaffected | Unaffected. |
| Amide interpolymer A alone | Essentially failed.[1] | Complete failure.[2] | Complete failure.[2] |

[1] Coating loosened; easily removable with fingernail.
[2] Coating completely removed from substrate.

Similar outstanding improvements in the properties of coatings made therefrom are attained when the above and other polyamides of the class described are blended with various amide interpolymers such as those described in the patents mentioned above.

According to the provisions of the patent statutes, there are described above the invention and what are now considered to be its best embodiments. However, within the scope of the appended claims, it is to be understood that the invention can be practiced otherwise than as specifically described.

I claim:

1. A resinous coating composition comprising:
   (a) an interpolymer of an unsaturated carboxylic acid amide and at least one other polymerizable ethylenically unsaturated monomer, said interpolymer being characterized by having amido hydrogen atoms replaced by the structure:

where R is a member selected from the group consisting of hydrogen and alkyl radicals, and $R_1$ is selected from the group consisting of hydrogen and organic radicals derived by removing a hydroxyl group from a monohydric alcohol; and
   (b) from about 1 to about 50 percent by weight of a polyamide having an amine number of at least about 50, said polyamide being derived from the reaction of polymeric fatty acids and a polyalkylene polyamine.

2. The composition of claim 1 in which said interpolymer contains from about 2 to about 50 percent by weight of said unsaturated carboxylic acid amide.

3. A resinous coating composition comprising:
   (a) an interpolymer of from about 2 to about 50 percent by weight of an unsaturated carboxylic acid amide and at least one other polymerizable ethylenically unsaturated monomer, said interpolymer being characterized by having at least about 50 percent of the amido groups having a hydrogen atom replaced by the structure —$CH_2OR_1$, where $R_1$ is an alkyl radical containing 1 to about 8 carbon atoms; and
   (b) from about 1 to about 50 percent by weight of a polyamide having an amine number of at least about 50, said polyamide being derived from the reaction of polymeric fatty acids and a polyalkylene polyamine.

4. The composition of claim 3 in which from about 3 to about 10 percent by weight of said polyamide is present.

5. A resinous coating composition comprising:
   (a) an interpolymer of from about 2 to about 50 percent by weight of acrylamide and at least one other polymerizable ethylenically unsaturated monomer, said interpolymer being characterized by having amido hydrogen atoms replaced by the structure —$CH_2OR_1$, where $R_1$ is alkyl containing 1 to about 8 carbon atoms; and
   (b) from about 1 to about 50 percent by weight of a polyamide having an amine number of at least about 50, said polyamide being derived from the reaction of polymeric fatty acids and a polyalkylene polyamine.

6. The composition of claim 5 in which said polyamide is derived from the reaction of polymeric fatty acids and an ethylene polyamine.

7. The composition of claim 5 in which said polyamide is derived from the reaction of dilinoleic acid and an ethylene polyamine.

8. An article comprising a metal surface having an adherent layer of a cured coating composition comprising:
(a) an interpolymer of an unsaturated carboxylic acid amide and at least one other polymerizable ethylenically unsaturated monomer, said interpolymer being characterized by having amido hydrogen atoms replaced by the structure:

$$-\overset{R}{\underset{|}{C}}HOR_1$$

where R is a member selected from the group consisting of hydrogen and alkyl radicals derived by removing a hydroxyl group from a monohydric alcohol, and $R_1$ is selected from the group consisting of hydrogen and organic radicals; and
(b) from about 1 to about 50 percent by weight of a polyamide having an amine number of at least about 50, said polyamide being derived from the reaction of polymeric fatty acids and a polyalkylene polyamine.

9. A method of coating an oily metal surface which comprises (1) applying to said surface, without first removing the oily film, a coating composition comprising:
(a) an interpolymer of an unsaturated carboxylic acid amide and at least one other polymerizable ethylenically unsaturated monomer, said interpolymer being characterized by having amido hydrogen atoms replaced by the structure:

$$-\overset{R}{\underset{|}{C}}HOR_1$$

where R is a member selected from the group consisting of hydrogen and alkyl radicals, and $R_1$ is selected from the group consisting of hydrogen and organic radicals derived by removing a hydroxyl group from a monohydric alcohol; and
(b) from about 1 to about 50 percent by weight of a polyamide having an amine number of at least about 50, said polyamide being derived from the reaction of polymeric fatty acids and a polyalkylene polyamine; and
(2) curing said composition while in contact with said surface by the application of heat.

References Cited by the Examiner
UNITED STATES PATENTS

| | | | |
|---|---|---|---|
| 2,891,023 | 6/1959 | Peerman et al. | 117—132 |
| 2,923,431 | 2/1960 | De Beers | 117—132 |
| 3,011,993 | 12/1961 | Kapalko et al. | 260—23 |
| 3,050,495 | 8/1962 | Christenson | 117—132 |
| 3,118,852 | 1/1964 | Christenson et al. | 260—849 |
| 3,118,853 | 1/1964 | Hart et al. | 260—849 |

LEON J. BERCOVITZ, *Primary Examiner.*